(12) United States Patent
Dotson et al.

(10) Patent No.: US 8,893,902 B2
(45) Date of Patent: Nov. 25, 2014

(54) ROLLER RAIL SYSTEMS AND ADJUSTMENT BRACKETS THEREFOR

(75) Inventors: David E. Dotson, Paris, KY (US);
Raymond Mead, Mt. Sterling, KY (US);
Lonnie G. Craig, Georgetown, KY (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 737 days.

(21) Appl. No.: 12/893,349

(22) Filed: Sep. 29, 2010

(65) Prior Publication Data
US 2012/0074088 A1    Mar. 29, 2012

(51) Int. Cl.
*A47B 45/00*    (2006.01)
*B65G 1/02*    (2006.01)

(52) U.S. Cl.
CPC *B65G 1/023* (2013.01); *A47B 45/00* (2013.01)
USPC ...................................... 211/151; 193/35 TE (58) Field of Classification Search
CPC .............................. B65G 13/11; B65G 13/12
USPC ......... 211/121, 122, 151, 208, 175, 134, 204, 211/206, 191; 193/35 R, 35 TE, 42; 5/202; 198/588, 594, 595, 812
See application file for complete search history.

(56) References Cited

U.S. PATENT DOCUMENTS

| 1,563,116 A | * | 11/1925 | Tinsley ........................ 211/151 |
| 2,593,089 A | * | 4/1952 | Barry .......................... 193/35 R |
| 2,613,788 A | * | 10/1952 | McLaughlin ............. 193/35 TE |
| 2,740,513 A |   | 4/1956 | Sullivan |
| 2,950,014 A | * | 8/1960 | Sullivan ........................ 211/151 |
| 3,068,983 A | * | 12/1962 | McLaughlin ............. 193/35 TE |
| 3,509,978 A | * | 5/1970 | Bedford ....................... 193/35 R |
| 3,586,142 A | * | 6/1971 | Inwood et al. .............. 193/35 R |
| 3,602,373 A | * | 8/1971 | Cassel ........................... 211/175 |
| 3,618,731 A | * | 11/1971 | Jindrich et al. .............. 193/35 J |
| 3,744,610 A | * | 7/1973 | Tabler .......................... 193/35 R |
| 3,857,473 A | * | 12/1974 | Kornylak ....................... 198/789 |
| 3,869,031 A |   | 3/1975 | Coleman et al. |

(Continued)

FOREIGN PATENT DOCUMENTS

| DE | 3440955 A1 | * | 5/1985 | ............. B65G 39/12 |
| WO | WO 9302000 A1 | * | 2/1993 | ............. B65G 13/11 |

OTHER PUBLICATIONS

English translation of DE3440955A1, May 23, 1985.*

*Primary Examiner* — Jonathan Liu
*Assistant Examiner* — Stanton L Krycinski
(74) *Attorney, Agent, or Firm* — Dinsmore & Shohl LLP (57) ABSTRACT

A roller rail system includes an adjustment bracket including a first roller rail assembly support portion and a second roller rail assembly support portion adjacent the first roller rail assembly support portion. The first and second roller rail assembly support portions are each configured to receive a roller rail assembly such that the roller rail assembly slides within the respective first and second roller rail assembly support portion relative to the adjustment bracket. A first roller rail assembly is received by the first roller rail assembly support portion. A second roller rail assembly is received by the second roller rail assembly support portion. The roller rail system has a retracted configuration where leading ends of the first and second roller rail assemblies are closer together and an extended configuration where the leading ends of the first and second roller rail assemblies are further apart.

15 Claims, 9 Drawing Sheets

(56) References Cited

U.S. PATENT DOCUMENTS

| | | | |
|---|---|---|---|
| 4,372,451 A | 2/1983 | Rasmussen et al. | |
| 4,681,203 A * | 7/1987 | Kornylak | 193/35 R |
| 4,969,548 A * | 11/1990 | Kornylak | 193/35 R |
| 5,259,518 A | 11/1993 | Sorenson et al. | |
| 5,295,591 A * | 3/1994 | Slater | 211/59.2 |
| 5,894,942 A | 4/1999 | Miyashita et al. | |
| 6,068,111 A * | 5/2000 | Smith et al. | 198/812 |
| 6,105,746 A * | 8/2000 | Faisant | 193/35 R |
| 6,105,798 A * | 8/2000 | Gruber et al. | 211/151 |
| 6,132,158 A | 10/2000 | Pfeiffer et al. | |
| 6,431,808 B1 | 8/2002 | Lowrey et al. | |
| 6,490,983 B1 | 12/2002 | Nicholson et al. | |
| 6,497,326 B1 | 12/2002 | Osawa | |
| 6,510,935 B1 * | 1/2003 | McIlvaine | 193/35 R |
| 6,554,116 B2 * | 4/2003 | Ransil | 193/35 SS |
| 6,560,796 B1 * | 5/2003 | Diforio | 5/200.1 |
| 6,585,473 B2 * | 7/2003 | Turner | 414/535 |
| 6,698,580 B2 * | 3/2004 | Diego | 198/588 |
| 7,090,064 B2 | 8/2006 | Lutz | |
| 7,134,154 B2 * | 11/2006 | Cloer et al. | 5/201 |
| 7,231,676 B2 * | 6/2007 | Cloer et al. | 5/310 |
| 7,607,527 B2 * | 10/2009 | Yazaki et al. | 193/35 R |
| 8,276,772 B2 * | 10/2012 | Kim | 211/151 |
| 2006/0108306 A1 * | 5/2006 | Minchey | 211/175 |
| 2006/0243861 A1 * | 11/2006 | Krueger | 244/137.1 |
| 2010/0025197 A1 * | 2/2010 | Gross et al. | 198/784 |
| 2010/0072152 A1 * | 3/2010 | Kim | 211/151 |

\* cited by examiner

ROLLER RAIL SYSTEMS AND ADJUSTMENT BRACKETS THEREFOR

TECHNICAL FIELD

The present specification generally relates to roller rail systems and, more particularly, to roller rail systems including adjustment brackets.

BACKGROUND

Various shelving systems and conveyors may utilize a roller-type element, such as a roller wheel or ball, to facilitate movement of goods or parts from one location to another along the shelving systems or conveyors. One example is a gravity feed shelving system that allows a rearward located good to feed forward once a forward located good is removed from the shelving system.

SUMMARY

In one embodiment, a roller rail system includes an adjustment bracket including a first roller rail assembly support portion and a second roller rail assembly support portion adjacent the first roller rail assembly support portion. The first and second roller rail assembly support portions are each configured to receive a roller rail assembly such that the roller rail assembly slides within the respective first and second roller rail assembly support portion relative to the adjustment bracket. A first roller rail assembly is received by the first roller rail assembly support portion. A second roller rail assembly is received by the second roller rail assembly support portion. The roller rail system has a retracted configuration where leading ends of the first and second roller rail assemblies are closer together and an extended configuration where the leading ends of the first and second roller rail assemblies are further apart.

In another embodiment, a shelving system includes multiple shelving regions. The shelving system includes a front horizontal support member and a rear horizontal support member. A roller rail system spans the front horizontal member and the rear horizontal member. The roller rail system includes an adjustment bracket including a first roller rail assembly support portion and a second roller rail assembly support portion adjacent the first roller rail assembly support portion. The first and second roller rail assembly support portions are each configured to receive a roller rail assembly such that the roller rail assembly slides within the respective first and second roller rail assembly support portion relative to the adjustment bracket. A first roller rail assembly is received by the first roller rail assembly support portion. A second roller rail assembly is received by the second roller rail assembly support portion. The roller rail system has a retracted configuration where leading ends of the first and second roller rail assemblies are closer together and an extended configuration where the leading ends of the first and second roller rail assemblies are further apart.

In another embodiment, a method of assembling a roller rail system is provided. The method includes positioning a first roller rail assembly in a first roller rail assembly support portion of an adjustment bracket; positioning a second roller rail assembly in a second roller rail assembly support portion of an adjustment bracket; and moving the first roller rail assembly relative to the second roller rail assembly with the first roller rail assembly located in the first roller rail assembly support portion to increase an overall length of the roller rail system.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein generally relate to roller rail systems utilizing an adjustment bracket that allows for adjustment of one or more roller rail assemblies relative to another roller rail assembly. In some embodiments, one of the roller rail assemblies may be adjusted along a length of the other roller rail assembly in order to adjust an overall length of the roller rail system. Such an adjustable roller rail system allows for use of the roller rail system with a plurality of shelving systems or conveyors having various dimensional requirements. Additionally, the adjustable roller rail systems can reduce the amount of scrap roller rail assemblies resulting from cutting the roller rail assemblies to a desired length to fit the various dimensional requirements of the shelving systems and conveyors.

Figure 1:
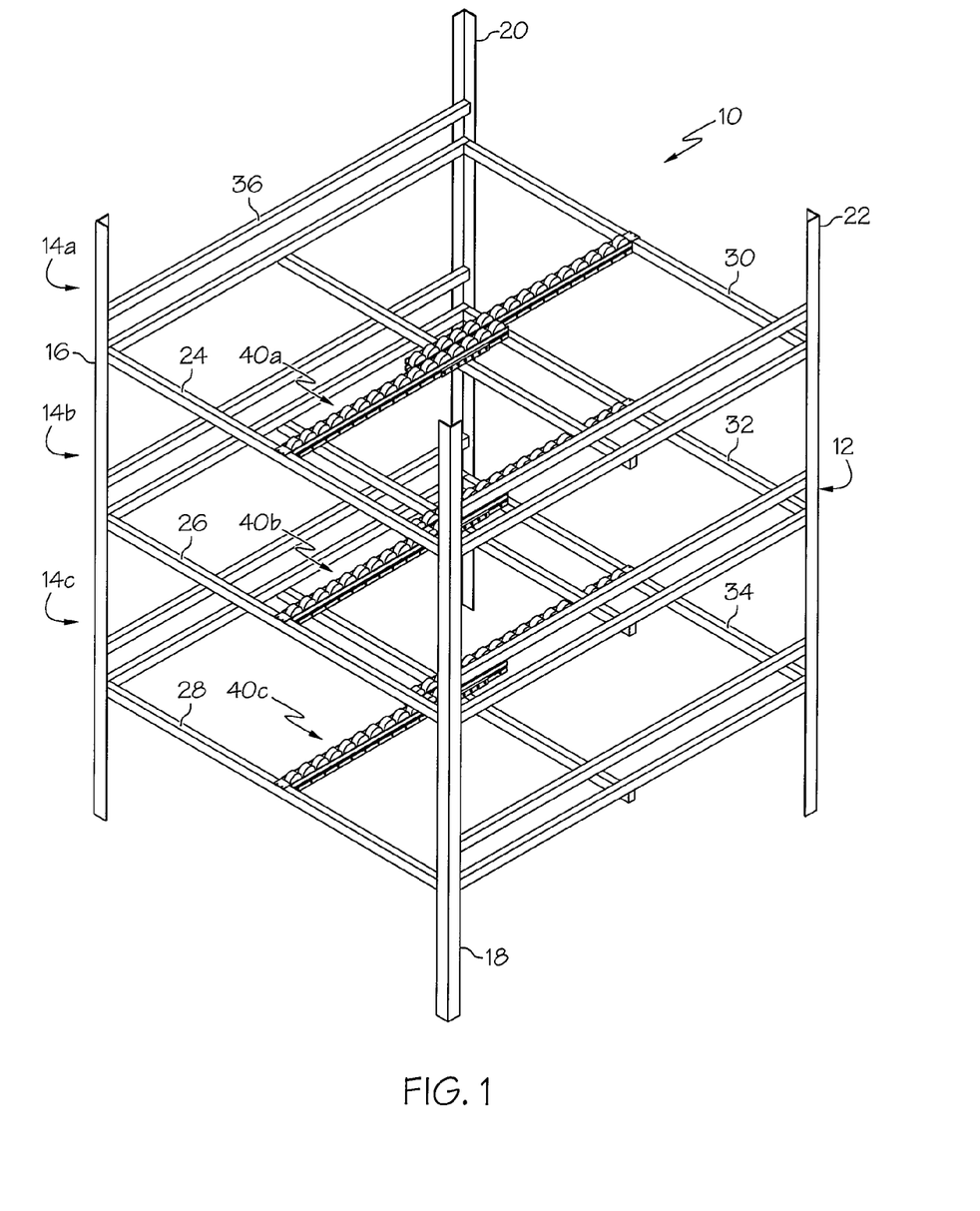
FIG. 1 is a perspective view of a shelving system including multiple roller rail systems according to one or more embodiments described herein.

Referring to FIG. 1, a shelving system 10 includes a frame 12 that supports a plurality of shelving regions 14a-14c. While only three shelving regions 14a-14c are illustrated, one over another, more or less than three shelving regions may be employed in a single column or multiple columns in a sideby-side arrangement. In the embodiment of FIG. 1, however, a single column of shelving regions 14a-14c is shown for illustration.

The frame 12 includes front vertical support members 16 and 18 and rear vertical support members 20 and 22 that are located at corners of the shelving system 10. Additional vertical support members may be located between the vertical support members 16, 18, 20 and 22, as needed depending on size, load requirements, etc. The front vertical support members 16 and 18 support front horizontal support members 24, 26 and 28 and the rear vertical support members 20 and 22 support rear horizontal support members 30, 32 and 34. In the illustrated exemplary embodiment, the rear horizontal support members 30, 32 and 34 are offset vertically above the front horizontal support members 24, 26 and 28. In other embodiments, the rear horizontal support members 30, 32 and 34 may be at about the same elevation as the front horizontal support members 24, 26 and 28 and/or the front horizontal support members 24, 26 and 28 may be offset vertically above the rear horizontal support members 30, 32 and 34. Side rails 36 and 38 may be provided for each of the shelving regions 14a-14c. Side rail 36 may be supported by the vertical support members 16 and 20 and the side rail 38 may be supported by the vertical support members 18 and 22. In other embodiments, no side rails may be provided or only one or some of the shelving regions 14a-14c may include side rails.

Figure 2:
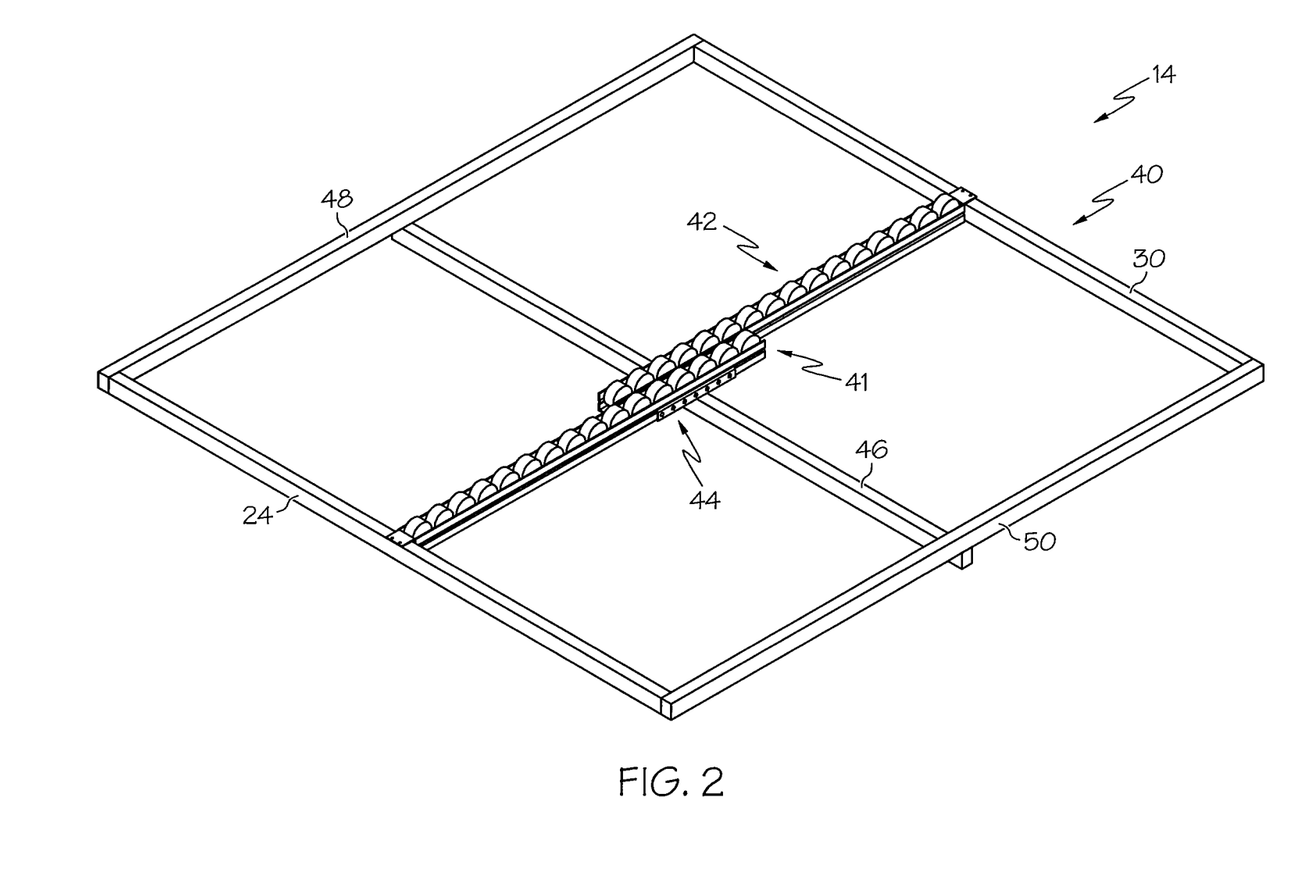
FIG. 2 illustrates a single shelving region with roller rail system according to one or more embodiments described herein.

A roller rail system 40a-40c is located at each shelving region 14a-14c. Referring to FIG. 2 illustrating one shelving region 14, the roller rail system 40 includes a first roller rail assembly 41 and a second roller rail assembly 42 adjacent the first roller rail assembly 41 in a side-by-side arrangement. The first roller rail assembly 41 extends from the front horizontal support member 24 to an adjustment bracket 44 and the second roller rail assembly 42 extends from the adjustment bracket 44 to the rear horizontal support member 30. In some embodiments, the adjustment bracket 44 is supported on a bracket support member 46 that extends between side horizontal support members 48 and 50 and is located between the front horizontal support member 24 and the rear horizontal support member 30. In the arrangement of FIG. 2, the roller rail system 40 spans the distance between the front horizontal support member 24 and the rear horizontal support member 30.

Figures 3, 4:
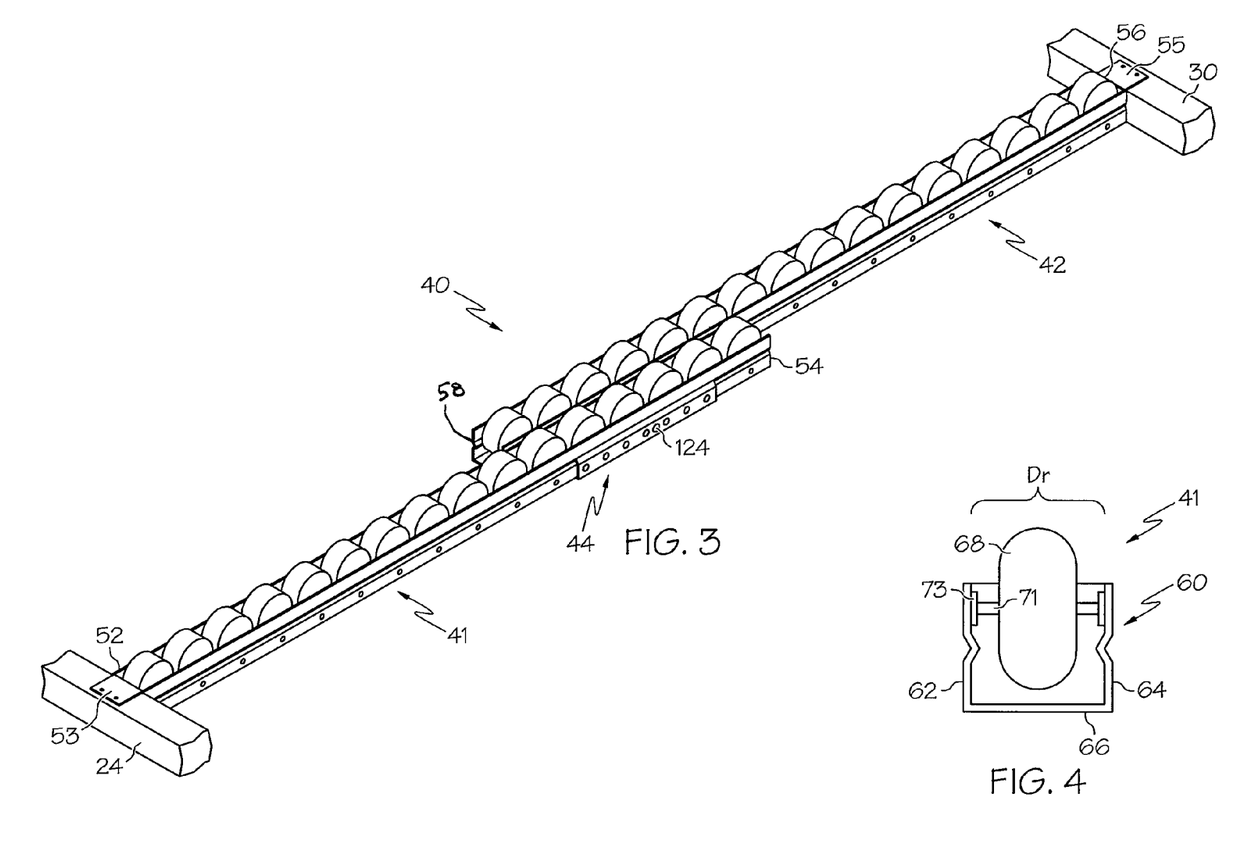
FIG. 3 is a side view of the roller rail system of FIG. 2 according to one or more embodiments described herein.
FIG. 4 illustrates an end, section view of a roller rail assembly for use in the roller rail system of FIG. 3 according to one or more embodiments described herein.

Referring to FIG. 3, in some embodiments, at least a portion of the second roller rail assembly 42 extends vertically above at least a portion of the first roller rail assembly 41. The first roller rail assembly 41 may include a leading end 52 and a trailing end 54 (FIG. 2). The leading end 52 of the first roller rail assembly 41 may be engaged with the front horizontal member 24. In some embodiments, a connecting tab 53 or other structure may be provided to connect the leading end 52 of the first roller rail assembly 41 to the front horizontal member 24. In some embodiments, the leading end 52 of the first roller rail assembly 41 may be connected to the front horizontal member 24, e.g., using fasteners, welding, adhesives, etc. In some embodiments, the first roller rail assembly 41 may include a hook-like member that is used to hook or mate with the front horizontal member 24 in a releasable fashion without use of any tools. The second roller rail assembly 42 may include a leading end 56 and a trailing end 58. The leading end 56 of the second roller rail assembly 42 may be engaged with the rear horizontal member 30. In some embodiments, the leading end 56 of the second roller rail assembly 42 may be connected to the rear horizontal member 30, e.g., using fasteners, welding, adhesives, etc. In some embodiments, a connecting tab 55 or other structure may be provided to connect the leading end 56 of the second roller rail assembly 42 to the rear horizontal member 30. As used herein, the term "leading end" of the roller rail assemblies 41 and 42 refers to the associated ends that are extended outwardly from the adjustment bracket 44 and located furthest from the adjustment bracket 44. Accordingly, the leading ends of the roller rail assemblies 41 and 42 may change depending on the direction they are extended relative to the adjustment bracket 44. In some embodiments, the second roller rail assembly 42 may include a hook-like member that is used to hook or mate with the rear horizontal member 30 in a releasable fashion without use of any tools.

Referring to FIG. 4, the roller rail assembly 41 includes a U-shaped housing member 60 including a first sidewall 62, a second sidewall 64 and a bottom wall 66 that extends between the first and second sidewalls 62, 64. Rotatably mounted between the first sidewall 62 and the second sidewall 64 are a plurality of roller wheels 68. The roller wheels 68 may be mounted between the first and second sidewalls 62, 64 in a linear fashion where each roller wheel 68 is in front of and/or behind an adjacent roller wheel 68. In some embodiments, axle pins 71 may be used to rotatably connect the roller wheels 68 to corresponding axle receiving structures 73. Any suitable connection may be used between the roller wheels 68 and the housing member 60 that allows for rotation of the roller wheels 68 relative to the housing member 60. In other embodiments, there may be multiple columns of roller wheels mounted in the housing member 60.

Figure 5:
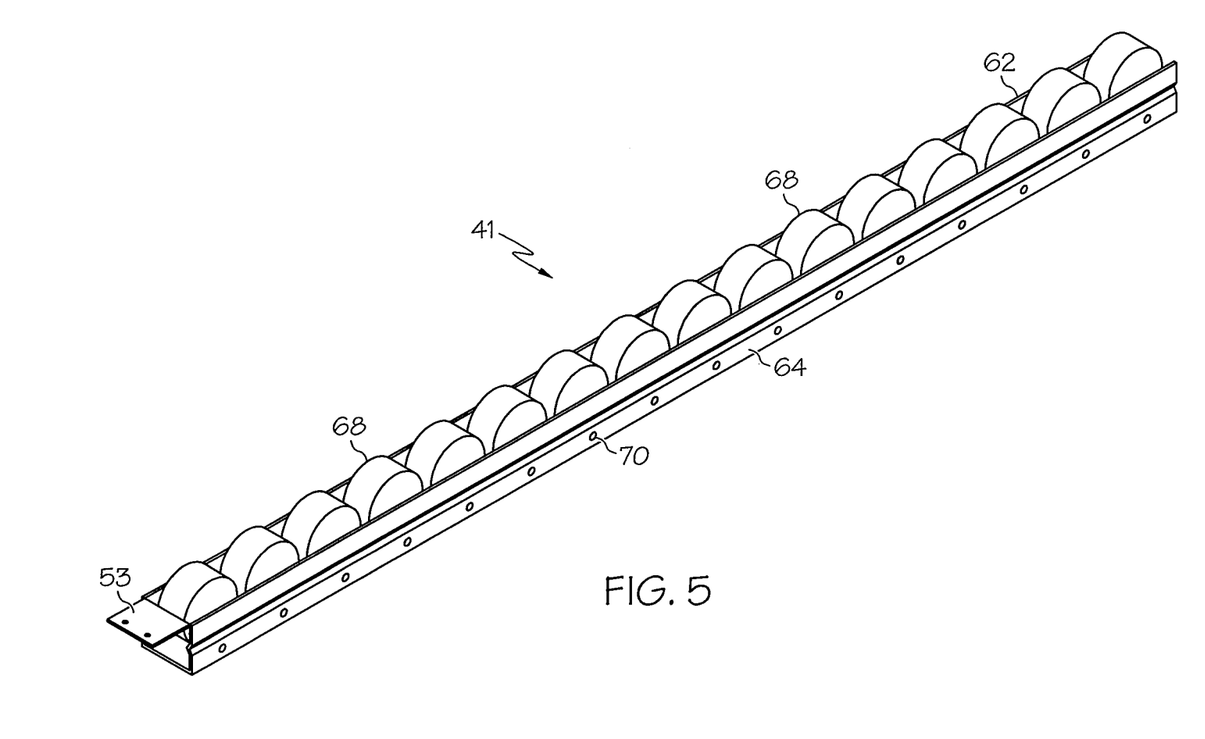
FIG. 5 illustrates a perspective, side view of the roller rail assembly of FIG. 4 according to one or more embodiments described herein.

Referring to FIG. 5, the roller rail assembly 41 includes the roller wheels 68 that extend above the sidewalls 62 and 64 to provide a dynamic roller surface that facilitates movement of an object thereon. The sidewalls 62 and 64 may each include openings 70 that extend through the sidewalls 62 and 64. The openings 70 may be located at least partially between adjacent roller wheels 68. In some embodiments, the openings 70 of the first sidewall 62 may be aligned across from or facing the openings 70 of the second sidewall 64. Such an aligned arrangement can facilitate passing a fastener or rod through each of the openings 70, between adjacent roller wheels 68. In other embodiments, the openings 70 of the first sidewall 62 may be offset from the openings 70 of the second sidewall 64.

Figure 6:
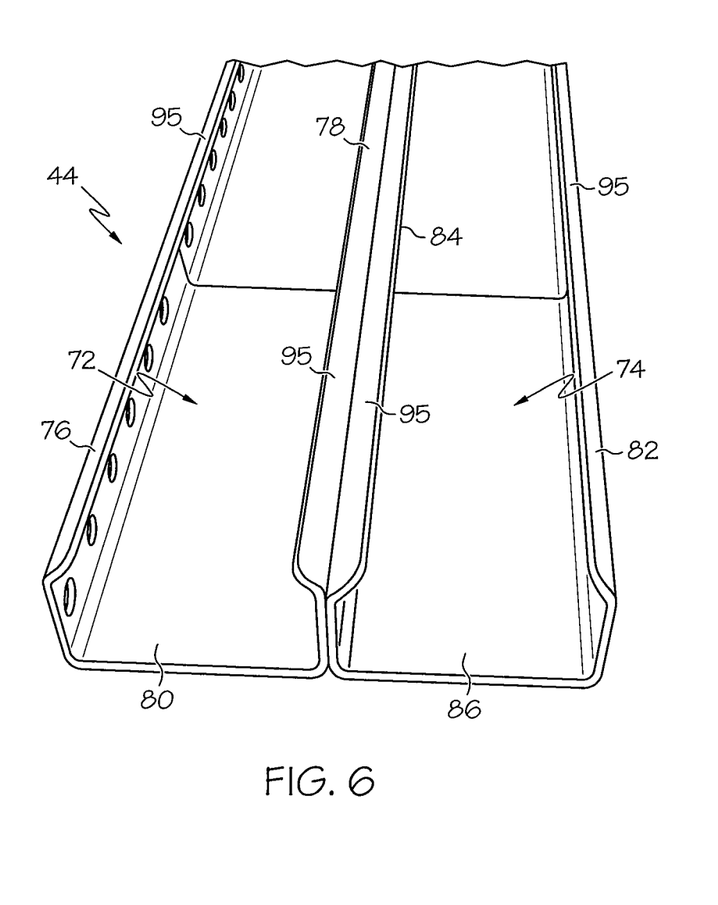
FIG. 6 illustrates a perspective, end view of an adjustment bracket for use in the roller rail system of FIG. 2 according to one or more embodiments described herein.

Referring to FIG. 6, the exemplary adjustment bracket 44 includes a first roller rail assembly support portion 72 and a second roller rail assembly support portion 74 that is adjacent the first roller rail assembly support portion 72. The first roller rail assembly support portion 72 includes an outer sidewall 76, an inner sidewall 78 and a floor 80 that extends between the outer sidewall 76 and the inner sidewall 78 thereby forming a somewhat U-shaped first roller rail assembly support portion 72. Similarly, the second roller rail assembly support portion 74 includes an outer sidewall 82, an inner sidewall 84 and a floor 86 that extends between the outer sidewall 82 and the inner sidewall 84 thereby forming a somewhat U-shaped first roller rail assembly support portion 74. In some embodiments, the first roller rail assembly support portion 72 may be formed separately from the second roller rail assembly support portion 74. The first and second roller rail assembly support portions 72 and 74 may then be connected together, for example, by welding, adhering or otherwise fastening the two roller rail assembly support portions 72 and 74 together such that their inner sidewalls 78 and 84 are side-by-side. In other embodiments, the adjustment bracket 44 may be formed as a single piece, for example, by molding, machining, etc.

Figure 7:
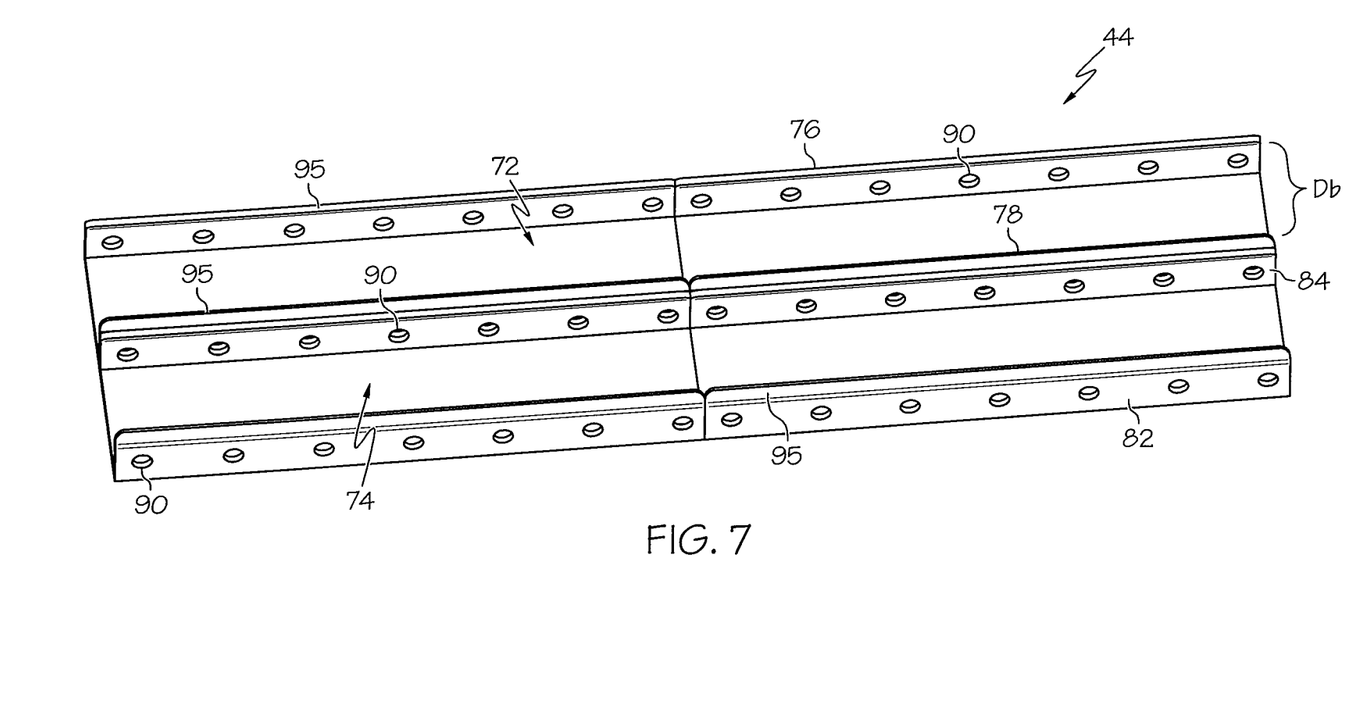
FIG. 7 illustrates a perspective, side view of the adjustment bracket of FIG. 6 according to one or more embodiments described herein.

Referring also to FIG. 7, each sidewall 76, 78, 82 and 84 may include openings 90 that extend through the sidewalls 76, 78, 82 and 84. In some embodiments, the openings 90 of each of the sidewalls 76, 78, 82 and 84 may be aligned with openings 90 of the other sidewalls 76, 78, 82 and 84. Such an aligned arrangement can facilitate passing a fastener or rod through each of the openings 90 between aligned openings 90. In other embodiments, the openings 90 of the sidewalls 76, 78, 82 and 84 may be offset. Each sidewall 76, 78, 82 and 84 may include bent overhang ledges 95 that extend over a length of the sidewalls 76, 78, 82 and 84. The bent overhang ledges 95 of each roller rail assembly support portion 72 and 74 may extend toward one another and overhang their respective floors 80 and 86. The bent overhang ledges 95 may be used to impede vertical movement of the roller rail assemblies 41 and 42 and facilitate sliding movement of the roller rail assemblies 41 and 42.

The distance $D_b$ between the sidewalls 76 and 78, 82 and 84 may be greater than a distance $D_r$ between sidewalls 62 and 64 of the roller rail assembly 41. The distance $D_b$ between the sidewalls 76 and 78, 82 and 84 may be selected to allow the roller rail assemblies 41 to slide horizontally between the sidewalls 76 and 78, 82 and 84 relative to each other.

Figure 8:
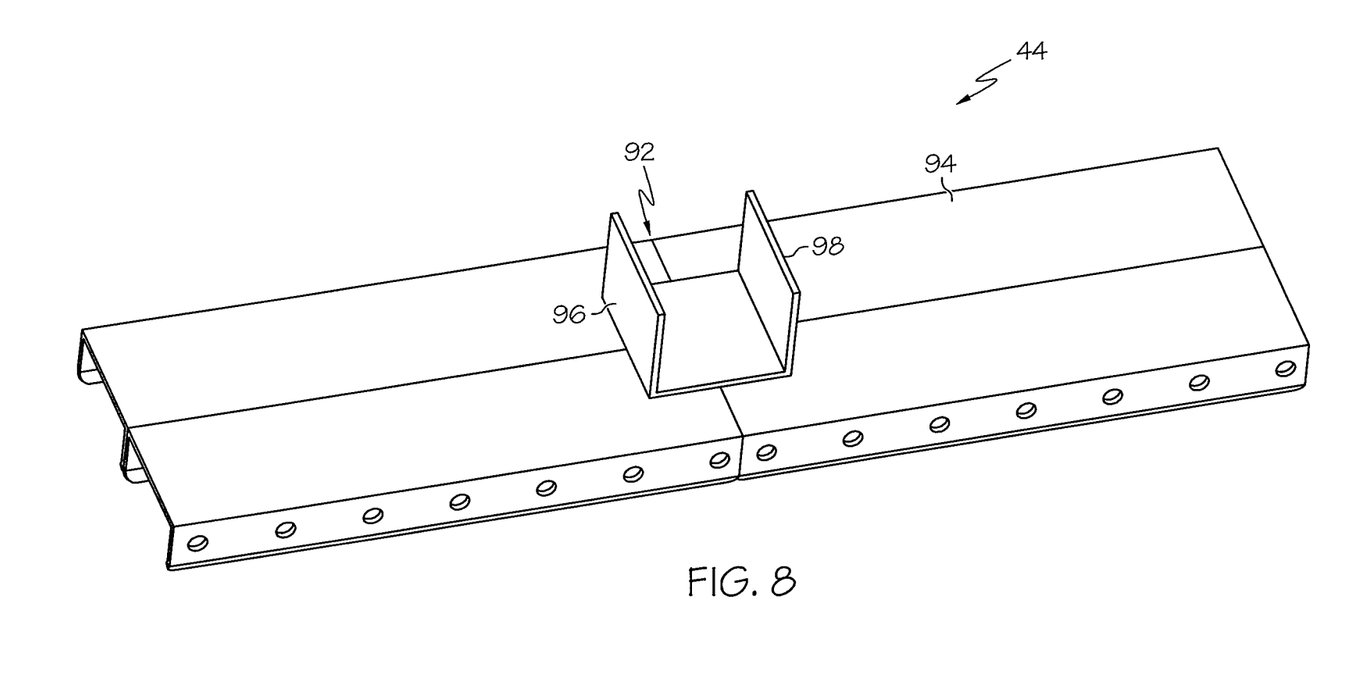
FIG. 8 illustrates a bottom view of the adjustment bracket of FIG. 6 according to one or more embodiments described herein.

Referring to FIG. 8, a connecting bracket 92 may be located at a bottom 94 of the adjustment bracket 44. In some embodiments, the connecting bracket 92 is a U-shaped member having sidewalls 96 and 98 that are sized to fit about the bracket support member 46. The connecting bracket 92 may include the sidewalls 96 and 98 that span both of the roller rail assembly support portions 72 and 74 and may be used to engage the connecting bracket 92 to limit movement of the adjustment bracket 44 away from the bracket support member 46 once engaged therewith. In some embodiments, the connecting bracket 92 may be configured for slidable engagement with the bracket support member 46 such that the adjustment bracket 44 can be slid along a length of the bracket support member 46 while engaged therewith.

Figure 9:
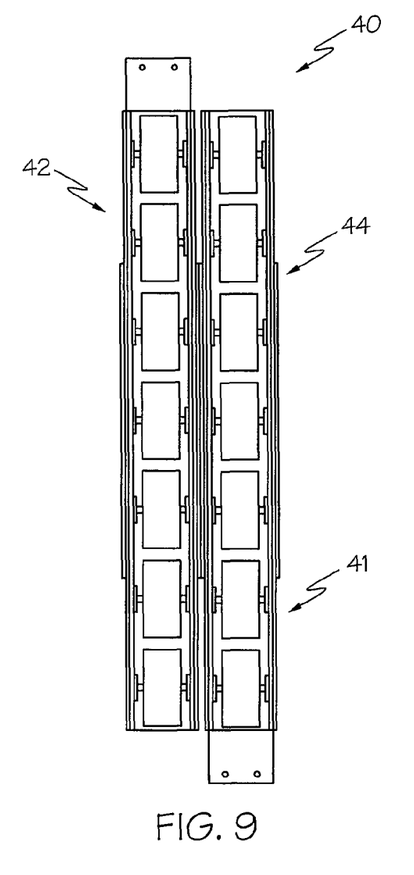
FIG. 9 illustrates a top view of the roller rail system of FIG. 3 in a retracted, shortened configuration according to one or more embodiments described herein.

FIG. 9 illustrates the adjustment bracket 44 with the first roller rail assembly 41 and the second roller rail assembly 42 adjacent the first roller rail assembly 41 in the side-by-side arrangement. In the embodiment of FIG. 9, the roller rail system 40 is in a retracted, shortened configuration where the ends of the first roller rail assembly 41 and the second roller rail assembly 42 are aligned, side-by-side such that a maximum length of the roller rail system 40 is about the same length as one of the first and second roller rail assemblies 41 and 42.

Figure 10:
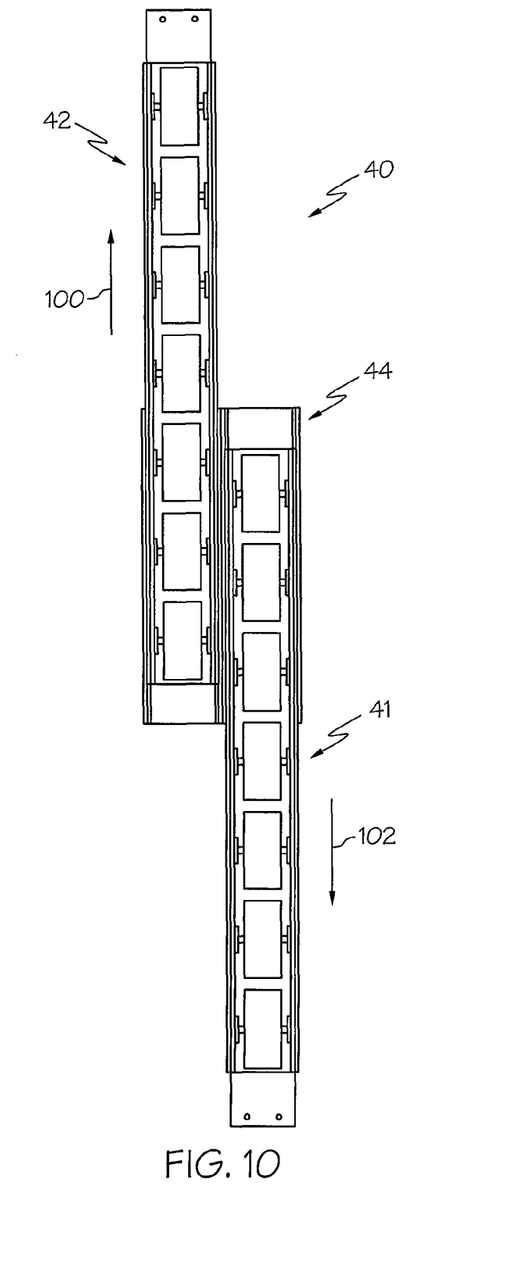
FIG. 10 illustrates a top view of the roller rail system of FIG. 3 in an expanded configuration.

Referring to FIG. 10, the adjustment bracket 44 allows for individual adjustment of the first roller rail assembly 41 and the second roller rail assembly 42 relative to each other in the directions of arrows 100 and 102. In some embodiments, both roller rail assemblies 41 and 42 may be adjustable along the same adjustment plane. In other embodiments, the first roller rail assembly 41 and the second roller rail assembly 42 may be adjustable along different planes. In the embodiment of FIG. 10, the roller rail system 40 is illustrated in an extended, elongated configuration where both of the roller rail assemblies 41 and 42 are moved relative to the other such that their ends are not aligned. In this elongated configuration, the total length of the roller rail system 40 measured between the ends of the first and second roller rail assembly 41 and 42 is greater than the length of one of the first and second roller rail assemblies 41 and 42. In some embodiments, for example, the roller rail system 40 may be expandable from about 1500 mm to about 3000 mm.

Figure 11:
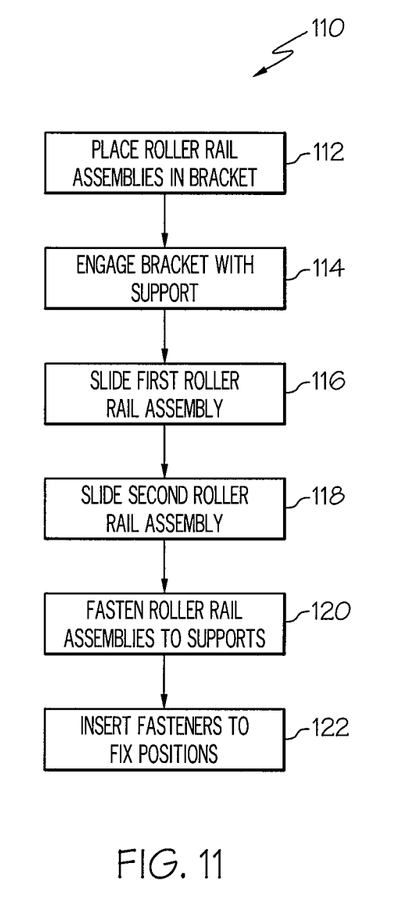
FIG. 11 illustrates a method of assembling the shelving and roller rail systems of FIG. 1 according to one or more embodiments described herein.

Referring to FIG. 11, a method 110 of assembling the roller rail system 40 is illustrated. At step 112, the first roller rail assembly 41 and the second roller rail assembly 42 may be placed in the first and second roller rail assembly support portions 72 and 74 in the side-by-side arrangement. The adjustment bracket 44 may then be engaged with the bracket support member 46 using the connecting bracket 92 at step 114. At step 116, the first roller rail assembly 41 may be slid forward in the first roller rail assembly support portion 72 relative to the second roller rail assembly 42 until the free end of the first roller rail assembly 41 engages the front horizontal support member 24. At step 118, the second roller rail assembly 42 may be slid rearward in the second roller rail assembly support portion 74 relative to the first roller rail assembly 41 until the free end of the second roller rail assembly 42 engages the rear horizontal support member 30. In some embodiments, the first and/or second roller rail assembly 41, 42 may be fastened to the front horizontal support member 24 and/or the rear horizontal support member 30 at step 120. At step 122, a fastener 124 (FIG. 3) may be inserted through one or more of the openings 70 and 90 to fix the positions of the first roller rail assembly 41 and the second roller rail assembly 42 relative to each other and relative to the bracket 44. The fastener 124 may be sized and located so as to not interfere with rolling of the roller wheels 68.

The above-described roller rail systems may include the roller rail assemblies that may be adjusted along a length of the other roller rail assembly in order to adjust an overall length of the roller rail system. Such adjustable roller rail systems can allow for use of the roller rail system with a plurality of shelving systems or conveyors having various dimensional requirements. Additionally, the adjustable roller rail systems can reduce the amount of scrap roller rail assemblies resulting from cutting the roller rail assemblies to a desired length to fit the various dimensional requirements of the shelving systems and conveyors.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A roller rail system comprising:
   an adjustment bracket including a first roller rail assembly support portion comprising a first U-shaped channel portion and a second roller rail assembly support portion comprising a second U-shaped channel portion adjacent the first U-shaped channel portion in a side-by-side arrangement, the first and second U-shaped channel portions each configured to receive a roller rail assembly such that the roller rail assembly slides within the respective first and second U-shaped channel portion relative to the adjustment bracket;
   a first roller rail assembly comprising a plurality of roller wheels that is received by the first U-shaped channel portion; and
   a second roller rail assembly comprising a plurality of roller wheels that is received by the second U-shaped channel portion;
   wherein the roller rail system has a retracted configuration where leading ends of the first and second roller rail assemblies are closer together and an extended configuration where the leading ends of the first and second roller rail assemblies are further apart;
   wherein the first and second U-shaped channel portions of the adjustment bracket have an open configuration such that the roller wheels of the first and second roller rail assemblies are exposed within the adjustment bracket in the retracted and extended configurations;

wherein the adjustment bracket has a sidewall, the sidewall includes a bent overhang ledge extending inwardly to overhang a portion of the first U-shaped channel portion to impede vertical movement of the first roller rail assembly out of the first U-shaped channel portion to allow sliding movement of the first roller rail assembly between the retracted and extended configurations.

2. The roller rail system of claim 1, wherein the adjustment bracket comprises a support bracket located at an underside of the adjustment bracket.

3. The roller rail system of claim 2, wherein the support bracket spans both the first and second U-shaped channel portions.

4. The roller rail system of claim 3, wherein the first and second U-shaped channel portions are welded together.

5. The roller rail system of claim 1, wherein the sidewall includes a plurality of openings that are spaced-apart along a length of the first U-shaped channel portion.

6. The roller rail system of claim 1, wherein the first roller rail assembly comprises a single column of roller wheels.

7. The roller rail system of claim 1, wherein an overall length of the roller rail system is adjustable from at least about 1500 mm to at least about 3000 mm.

8. A shelving system comprising multiple shelving regions, the shelving system comprising:
   a front horizontal support member;
   a rear horizontal support member; and
   a roller rail system spanning the front horizontal member and the rear horizontal member, the roller rail system comprising:
      an adjustment bracket including a first roller rail assembly support portion comprising a first U-shaped channel portion and a second roller rail assembly support portion comprising a second U-shaped channel portion adjacent the first U-shaped channel portion in a side-by-side arrangement, the first and second U-shaped channel portions each configured to receive a roller rail assembly such that the roller rail assembly slides within the respective first and second U-shaped channel portion relative to the adjustment bracket;
      a first roller rail assembly comprising a plurality of roller wheels that is received by the first U-shaped channel portion; and
      a second roller rail assembly comprising a plurality of roller wheels that is received by the second U-shaped channel portion;
   wherein the roller rail system has a retracted configuration where leading ends of the first and second roller rail assemblies are closer together and an extended configuration where the leading ends of the first and second roller rail assemblies are further apart;
   wherein the first and second U-shaped channel portions of the adjustment bracket have an open configuration such that the roller wheels of the first and second roller rail assemblies are exposed within the adjustment bracket in the retracted and extended configurations;
   wherein the adjustment bracket has a sidewall, the sidewall includes a bent overhang ledge extending inwardly to overhang a portion of the first U-shaped channel portion to impede vertical movement of the first roller rail assembly out of the first U-shaped channel portion to allow sliding movement of the first roller rail assembly between the retracted and extended configurations.

9. The shelving system of claim 8, wherein the first roller rail assembly is engaged with the front horizontal support member and the second roller rail assembly is engaged with the rear horizontal support member.

10. The shelving system of claim 8, wherein the adjustment bracket comprises a support bracket located at an underside of the adjustment bracket.

11. The shelving system of claim 10, wherein the support bracket spans both the first and second U-shaped channel portions.

12. The shelving system of claim 11, wherein the first and second U-shaped channel portions are welded together.

13. The shelving system of claim 8, wherein the sidewall includes a plurality of openings that are spaced-apart along a length of the first U-shaped channel portion.

14. The shelving system of claim 8, wherein an overall length of the roller rail system is adjustable from at least about 1500 mm to at least about 3000 mm.

15. The roller rail system of claim 1, wherein the first and second roller rail assemblies extend between the retracted and extended configurations without intersecting.

* * * * *